United States Patent [19]

Beard et al.

[11] Patent Number: 4,812,281

[45] Date of Patent: Mar. 14, 1989

[54] PRESSURIZATION OF TIRE MOLD VENTS

[75] Inventors: Richard C. Beard, Massillon; Carl W. Crispin, Akron, both of Ohio

[73] Assignee: The Goodyear Tire & Rubber Company, Akron, Ohio

[21] Appl. No.: 132,038

[22] Filed: Dec. 14, 1987

[51] Int. Cl.[4] .................. B29C 35/02; B28B 7/12; B28B 17/00

[52] U.S. Cl. .................. 264/502; 264/315; 264/335; 425/28.1; 425/46; 425/437; 425/812

[58] Field of Search .............. 264/315, 326, 335, 500, 264/501, 502, 503; 425/28 R, 437, 812, 46, 28.1

[56] References Cited

U.S. PATENT DOCUMENTS

| | | | |
|---|---|---|---|
| 2,023,002 | 12/1935 | Bosmworth | 18/2 |
| 2,169,146 | 8/1939 | Iverson | 425/437 |
| 2,230,778 | 2/1941 | Flores | 425/437 |
| 2,581,939 | 1/1952 | Deist et al. | 425/28 R |
| 2,699,198 | 1/1955 | Balzhiawe | 154/9 |
| 3,619,444 | 11/1971 | Roth | 264/89 |
| 3,876,356 | 4/1975 | Fazekas et al. | 425/144 |
| 3,931,381 | 1/1976 | Lindberg | 264/45.5 |
| 4,021,168 | 5/1977 | Dailey | 425/28 R |
| 4,436,497 | 3/1984 | Dahl et al. | 425/28 R |
| 4,531,902 | 7/1985 | Stuhldreber et al. | 425/408 |
| 4,662,833 | 5/1987 | Carter | 425/28 R |

*Primary Examiner*—Jan H. Silbaugh
*Assistant Examiner*—Neil M. McCarthy
*Attorney, Agent, or Firm*—Frederick K. Lacher; T. P. Lewandowski

[57] ABSTRACT

Tire mold vents (34) in communication with a sealed cavity (35) are pressurized for limiting the quantity of rubber entering the vents (34) and for assisting the stripping of the vulcanized tire (28) from the mold. Passages (40) in the mold communicate fluid pressure to the vents (34) and pressure regulators (58,60) control the fluid pressure communicated to the vents (34) during vulcanization and during ejection of the tire (28) from the mold (10).

6 Claims, 2 Drawing Sheets

PRESSURIZATION OF TIRE MOLD VENTS

In the manufacture of tires having low rolling resistance tread compounds, deep nonskid and other aggressive tread patterns in two-piece, low aspect ratio molds there have been problems in stripping the tires from the molds without tearing and heat fracture of the tread. Segmental molds have been provided to alleviate this problem; however, the cost of the molds is substantially greater than the cost of two-piece molds and the lead time necessary to obtain the segmental molds is substantially greater than the lead time for obtaining two-piece molds. Trimming the rubber which flows into the tread vents has also been an expense which has been necessary where vents are used to remove the air from the mold during vulcanization.

Heretofore, it has been proposed to insert nails or reduced diameter vent plugs in the tire mold vents to prevent the rubber entering the vents during vulcanization. This has reduced the effectiveness of the vents and required an increased number of vents to provide the same amount of venting.

To assist in removing bias ply tires from a two-piece mold it has been proposed to provide an air passage in the mold at one side and then another air passage at a diametrically opposite side of the two-piece mold. This has required the drilling of an air port in each of the molds and installing a suitable valve. The stripping of a bias ply tire with one or two air passages has required injection of air between the sidewalls of the tire and the mold to pull the tread away from the mold. This is not feasible with wide tread steel belted radial tires where the sidewalls are very flexible and the belted treads are stiff so that the force necessary to pull the tread away from the tread forming surface of the tread ring would deform and damage the tire.

In forming molds used in forming sheet stock and in thermoforming molds for thermoplastic material, vents and air ducts in the molds have been provided; however, the molded material has not entered the vents nor has there been any provision made for using the vents to strip the formed articles from the molds.

The present invention is directed to a method and apparatus for molding and vulcanizing a tire in a two-piece mold having a plurality of vents. Sealed cavities are provided in the mold for communicating fluid pressure to the vents from a fluid pressure source at controlled pressures for desired intervals of time. In this way the amount of rubber entering the vents during molding and vulcanization is controlled to provide a substantially trimless tire. Also assistance for ejection of the tire is provided in a manner which does not contribute to tearing of the molded tread or otherwise damaging the tire.

In accordance with an aspect of this invention there is provided a tire mold having at least two pieces and comprising a mold body, a tread ring, a plurality of vent holes located at spaced positions in a molding surface of the tread ring, a sealed cavity between the mold body and the tread ring, the cavity including fluid passages extending around the mold body in communication with the vent holes, ports, in the mold in communication with the passages and in communication with a source of fluid pressure and control means for regulating the fluid pressure and interval of time the pressure is communicated to the vent holes.

In accordance with another aspect of the invention there is provided a method of molding and vulcanizing a reinforced rubber tire casing in a heated tire mold having a mold body and a tread ring with a sealed cavity between the mold body and the tread ring in communication with a plurality of vent holes at spaced-apart positions in a molding surface of the tread ring wherein a source of fluid pressure is in communication with the sealed cavity comprising:

(a) opening the mold;

(b) placing an unvulcanized tire casing in the mold;

(c) closing the mold and expanding the tire casing to form the tire casing and fill out the mold while permitting removal of fluid through the vent holes;

(d) applying fluid pressure to the sealed cavity to pressurize the vent holes for separating the tire casing from the molding surface;

(e) opening the mold; and (f) unloading the tire casing.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and as will become apparent to those skilled in these arts can be modified in numerous ways within the spirit and scope of the invention defined in the claims hereof.

Figure 1:
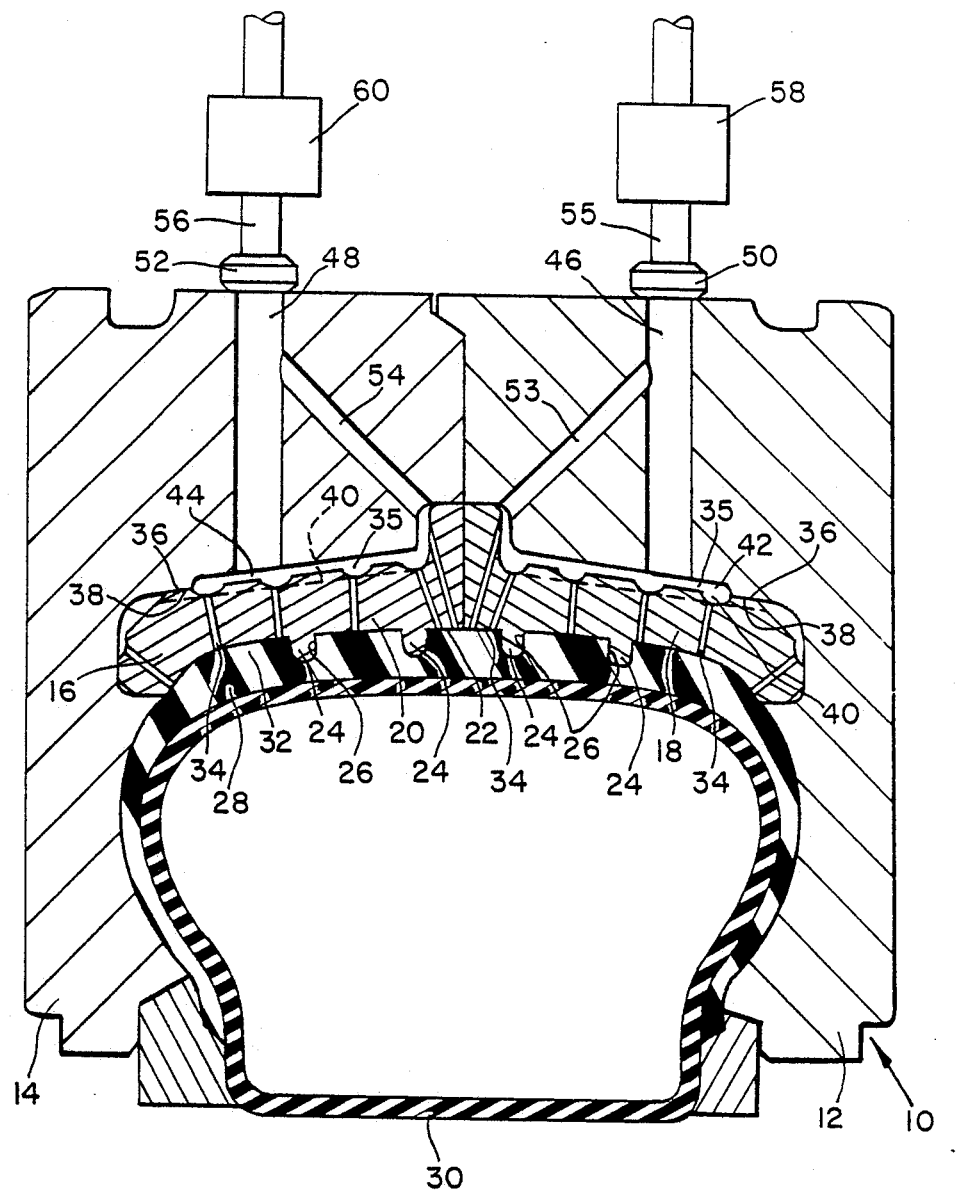
FIG. 1 is a cross-sectional view of one-half of a tire mold embodying the invention showing the tire casing and bladder in position for molding and vulcanizing the tire.
Figure 2:
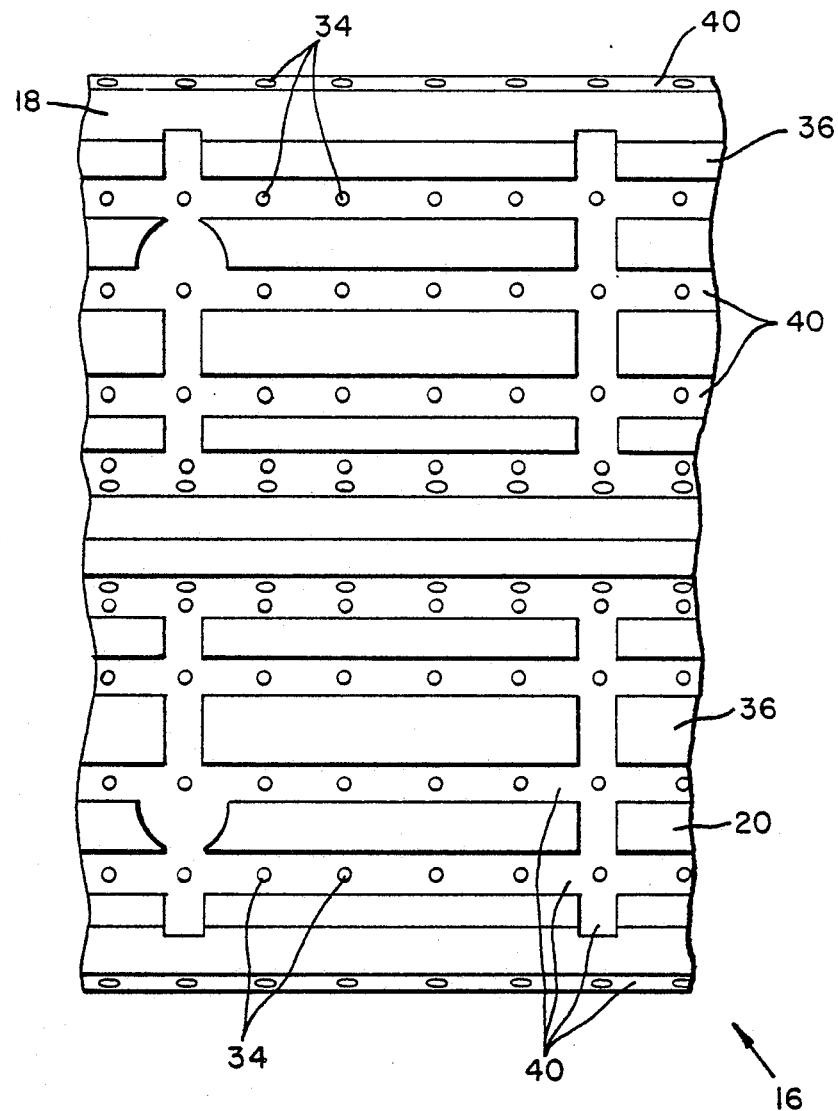
FIG. 2 is a fragmentary plan view of the radially outer mold contacting surface of the tread ring halves showing the grooves for communicating fluid under pressure to the vent holes in the tread ring.

Referring to FIGS. 1 and 2, a two-piece mold 10 is shown having a mold body with a top mold half 12 and a bottom mold half 14. A tread ring 16 having a top ring half 18 and a bottom ring half 20 is fastened to the top mold half 12 and bottom mold half 14 by suitable fasteners. The top ring half 18 and bottom ring half 20 have a tread molding surface 22 which may have ribs 24 for forming grooves 26 and other tread configurations in a tire casing 28. A bladder 30 or other suitable inflating means may be provided inside the tire casing 28 to expand the casing and urge a tread portion 32 of the tire casing against the ring halves 18 and 20 so that the ribs 24 will form the tread pattern in the tread portion.

A plurality of vent holes 34 are provided in the thread molding surface 22 of the top ring half 18 and bottom ring half 20 of the tread ring 16. The vent holes 34 preferably extend through the ring halves 18 and 20 to sealed cavities 35 between a mold contacting surface 36 and a tread ring supporting surface 38 of the top mold half 12 and bottom mold half 14. Fluid communicating channels 40 are provided in the tread ring supporting surface 38 to form fluid communicating passages in communication with the vent holes 34. The fluid communicating channels 40 in the top ring half 18 lead to a manifold groove 42 and the channels in the bottom ring half 20 lead to a manifold groove 44. The manifold grooves 42 and 44 preferably extend completely around the ring halves 18 and 20. Fluid conducting conduits such as air ports 46 and 48 are provided in the top mold half 12 and bottom mold half 14, respectively, opening on the manifold groove 42 and manifold groove 44, respectively, and to suitable connections outside the mold halves 12 and 14 such as quick-disconnect fittings 50 and 52. Multiple air ports may be provided depending on the capacity of the fluid pressure source. Also supplementary air ports 53 and 54 may be provided extending from the air ports 46 and 48 to the sealed cavities 35 at a central portion of the mold body to provide sufficient fluid pressure at the central portion. Fluid pressure is communicated to the air ports 46 and 48 by independent air lines 55 and 56 connected to pressure regulators 58 and 60 in communication with a pressure source such as factory air. The pressure regulators 58 and 60 are connected to the controls for the tire press (not shown) in which the mold 10 is mounted.

The vent holes 34 may have a diameter of from 0.15 to 0.50 inches (3.81 to 1.27 mm). Each ring half 18 and 20 of this embodiment has 200 vent holes 34. The air ports 46 and 48 have a diameter of one inch (2.54 cm), the supplementary air ports 53 and 54 have a diameter of one-quarter inch (0.635 cm) and the air lines 55 and 56 have an inside diameter of one inch (2.54 cm). Preferably the sum of the cross-sectional areas of the vent holes 34 in the ring halves 18 and 20 is substantially the same as the sum of the areas of the air ports 46 and 48 supplying air to the vent holes of the respective ring halves.

The two-piece mold 10 may be mounted in a tire press for opening the mold by separating the top mold half 12 from the bottom mold half 14. The tire casing 28 is then placed between the mold halves 12 and 14 with the bladder 30 in the tire casing. Alternatively a bladder having edges attached to movable rims of the press may be expanded into the tire casing 28 as the top mold half 12 and bottom mold half 14 are moved together to close the mold 10.

After the mold 10 is closed, heat is applied to the tire casing 28 by heating the mold for vulcanizing the rubber in the casing. The rubber in the tread portion 32 will flow around the ribs 24 and air and other gases between the tread molding surface 22 and mold contacting surface 36 may escape through the vent holes 34 to the sealed cavities 35. After the top mold half 12 and bottom mold half 14 are moved together to the closed position, shown in FIG. 1, suitable fluid pressure such as air pressure from 80 to 200 psi (5.62 to 14.06 kg/cm$^2$) and preferably air pressure at 100 psi (7.03 kg/cm$^2$) is then communicated to the vent holes 34 to resist the entrance of the unvulcanized rubber into the vent holes so that upon removal of the vulcanized tire casing 28, projections of rubber at the vent holes will not have to be trimmed away.

After curing of the tire casing 28 and just prior to opening the press, air pressure is again communicated to the sealed cavities 35 to pressurize the vent holes 34 to urge the thread portion 32 of the tire casing 28 away from the tread molding surface 22. Then upon opening of the tire mold 10 with the top mold half 12 moving away from the bottom mold half 14, the vulcanized tire casing 28 may be removed from the mold without damaging the thread portion 32. If desired, the air pressure may be communicated to the vent holes 34 of the top mold half 12 before communicating the air pressure to the bottom mold half 14 so that the tread portion 32 will not stick to the top mold half. Then upon further opening of the mold 10, air pressure may be communicated to the vent holes 34 of the bottom mold half 14 to facilitate removal of the tread portion 32 in contact with the bottom ring half 20.

The time that the air pressure, controlled by the pressure regulators 58 and 60, is communicated to the vent holes 34 may be from 5 to 15 seconds, depending on the tread stiffness of the tire. This time interval may be controlled by the timer (not shown) used for the operation of the tire press. This timer is set to control the length of cure and other functions of the press.

While a certain representative embodiment and details have been shown for the purpose of illustrating the invention, it will be apparent to those skilled in the art that various changes and modifications may be made therein without departing from the spirit or scope of the invention.

What is claimed is:

1. A method of forming a substantially trimless tire by molding and vulcanizing a reinforced rubber tire casing in a heated tire mold having a mold body and a tread ring with a sealed cavity between said mold body and said tread ring in communication with a plurality of vent holes at spaced-apart positions in a molding surface of said tread ring wherein a source of fluid pressure is in communication with said sealed cavity comprising:
   (a) opening said mold;
   (b) placing an unvulcanized tire casing having a tread portion in said mold;
   (c) closing said mold and expanding said tire casing against said tread ring to form a tread pattern in said tread portion and fill out of said mold while permitting air and other gases trapped between an outer surface of said tread portion and said tread ring to escape through said vent holes;
   (d) vulcanizing the expanded tire casing and applying fluid pressure to said sealed cavity sufficient to pressurize said vent holes to limit entrance of rubber into said vent holes during said vulcanizing of said tire casing;
   (e) then applying fluid pressure to said sealed cavity sufficient to pressurize said vent holes for separating said tire casing from said molding surface;
   (f) opening said mold; and,
   (g) unloading said substantially trimless tire from said mold.

2. The method of claim 1 wherein said fluid pressure is communicated to said sealed cavity to pressurize said vent holes just prior to opening said mold for separating said tread portion from said tread ring.

3. The method of claim 1 wherein said mold has two pieces with a top sealed cavity between a top mold section and a top ring half, a bottom sealed cavity between a bottom mold section and a bottom ring half, and means for applying pressure to said top sealed cavity in said top ring half separately from the application of pressure to said bottom sealed cavity in said bottom ring half upon opening of said mold.

4. The method of claim 1 wherein fluid pressure is applied to said bottom sealed cavity in said bottom ring half after fluid pressure is applied to said top sealed cavity in said top ring half to prevent sticking of said tire casing to said top ring half.

5. The method of claim 1 wherein said tread pattern is formed by inflating a bladder inside said casing during vulcanization including the step of reducing the fluid pressure inside said bladder just prior to opening said mold when fluid pressure is communicated to said sealed cavity for separating said tread portion from said tread ring.

6. The method of claim 1 wherein said fluid pressure applied for separating said tread portion from said tread ring is air pressure from 80 to 200 psi ((5.62 to 14.06 kg/cm$^2$) and said air pressure is applied for an interval of from 5 to 15 seconds.

* * * * *